(12) United States Patent
Saito (10) Patent No.: US 11,456,471 B2
(45) Date of Patent: Sep. 27, 2022

(54) FUEL CELL SYSTEM AND METHOD OF CONTROLLING FUEL CELL SYSTEM

(71) Applicant: TOYOTA JIDOSHA KABUSHIKI KAISHA, Toyota (JP)

(72) Inventor: Hiromu Saito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 597 days.

(21) Appl. No.: 16/135,581

(22) Filed: Sep. 19, 2018

(65) Prior Publication Data

US 2019/0088961 A1 Mar. 21, 2019

(30) Foreign Application Priority Data

Sep. 21, 2017 (JP) .............................. JP2017-180865

(51) Int. Cl.
*H01M 8/04858* (2016.01)
*H01M 8/04537* (2016.01)
(Continued)

(52) U.S. Cl.
CPC ..... *H01M 8/0494* (2013.01); *H01M 8/04388* (2013.01); *H01M 8/04395* (2013.01); *H01M 8/04589* (2013.01); *H01M 8/04611* (2013.01); *H01M 8/04656* (2013.01); *H01M 16/006* (2013.01); *H01M 2200/20* (2013.01); *H01M 2250/20* (2013.01)

(58) Field of Classification Search
None
See application file for complete search history.

(56) References Cited

U.S. PATENT DOCUMENTS 4,258,421 A * 3/1981 Juhasz .................. G07C 5/085
701/33.9
2010/0023207 A1 1/2010 Maeda et al.
(Continued)

FOREIGN PATENT DOCUMENTS

CN 101583519 A 11/2009
EP 1132251 A1 * 9/2001 .............. B60L 58/40
(Continued)

OTHER PUBLICATIONS

Atsushi et. al. (JPH10285710A) (Year: 2).*
(Continued)

*Primary Examiner* — Nathanael T Zemui
(74) *Attorney, Agent, or Firm* — Finnegan, Henderson, Farabow, Garrett & Dunner, LLP (57) ABSTRACT

The present disclosure makes it possible to store data on the cause of an output shortage in a memory while reducing the capacity of the memory for storing data on an output shortage. A fuel cell system of the present disclosure comprises: a drive motor for driving a vehicle; a plurality of power sources that include a fuel cell and a secondary battery; a memory that stores data on a failure of output of the drive motor; and a controller that controls writing of the data on the failure into the memory. When an actual output value of the drive motor is smaller than a reference value decided by an output request value, the controller stores in the memory data on operating state of one of power sources, with an actual output value smaller than a power source output request value.

6 Claims, 4 Drawing Sheets

(51) Int. Cl.
*H01M 16/00* (2006.01)
*H01M 8/0438* (2016.01)

(56) References Cited

U.S. PATENT DOCUMENTS

| | | | |
|---|---|---|---|
| 2010/0279187 A1* | 11/2010 | Yoshida | B60L 58/40 |
| | | | 429/429 |
| 2013/0059215 A1 | 3/2013 | Kawahara et al. | |
| 2013/0095405 A1 | 4/2013 | Kawahara et al. | |
| 2015/0221145 A1 | 8/2015 | Nomura | |

FOREIGN PATENT DOCUMENTS

| | | |
|---|---|---|
| JP | H 10285710 A | 10/1998 |
| JP | 2001-069615 A | 3/2001 |
| JP | 2011-249078 | 12/2011 |
| JP | 2012-009406 | 1/2012 |
| JP | 2014-155298 A | 8/2014 |
| JP | 2015-144517 A | 8/2015 |

OTHER PUBLICATIONS

U.S. Appl. No. 16/028,060, filed Jul. 5, 2018, which claims priority to Japanese application No. 2017-133251, filed Jul. 7, 2017.

* cited by examiner

FUEL CELL SYSTEM AND METHOD OF CONTROLLING FUEL CELL SYSTEM

CROSS REFERENCE TO RELATED APPLICATIONS

The present application claims the priority based on Japanese Patent Application No. 2017-180865 filed on Sep. 21, 2017, the disclosure of which is hereby incorporated by reference in its entirety.

BACKGROUND

Field

The present disclosure relates to a fuel cell system and a method of controlling a fuel cell system.

Related Art

It has been suggested that, in a fuel cell system installed on a vehicle, the output of a fuel cell is temporarily limited to maintain appropriate control. For example, JP 2012-009406A and JP 2011-249078A describe that, during operation of a fuel cell system, when the occurrence of a negative cell voltage is detected in any of a plurality of cells included in a fuel cell, the output of the fuel cell is limited.

During driving of a vehicle equipped with a fuel cell system, the information on various events in the fuel cell system such as limitation to the output of the fuel cell described above is saved in a vehicle control history at each time of occurrence of an event. The information on the various events in the fuel cell system is used for maintenance and repairs at service stores and others.

There is a limitation on areas of a memory assigned for storing the vehicle control history. Accordingly, there is an upper limit in the number of sets of storable information in a mode in which the information on an event is stored at each time of occurrence of the event. Therefore, if there occurs a Larger number of events than the number of storable areas, for example, the previously stored event information may be overwritten and erased by the new event information.

As a solution to this problem, the number of areas in which the information on events can be individually stored is increased by limiting the information to be saved on each event to preselected information. However, this solution has a problem described below. A output shortage(driving force shortage) of a vehicle equipped with a fuel cell system is possibly caused by a plurality of factors including a limitation on the output of a fuel cell described above in the section of related art, an output shortage of a secondary battery, an output shortage of a drive motor, and others. Accordingly, to analyze the cause of an output shortage by using the vehicle control history, it is desired that all the information necessary for analysis of the cause of an output shortage in each of the fuel cell, the secondary battery, and the drive motor is included in the vehicle control history information. However, when the information to be saved in the vehicle control history is selectively limited as described above, it might be determined that the cause resides in which of the fuel cell, the secondary battery, and the drive motor, but the detailed factor might not be analyzed due to an insufficient amount of information necessary for analyzing the detailed factor. Therefore, it may be difficult to use the vehicle control history to take remedial measures on the cause of the output shortage at service stores and others.

SUMMARY

In an aspect of the present disclosure, there is provided a fuel cell system installed on a vehicle. The fuel cell system comprises: a drive motor that drives the vehicle; a plurality of power sources that include a fuel cell and a secondary battery; a memory that stores data on a failure of output of the drive motor as a history; and a controller that controls writing of the data on the failure into the memory. When an actual output value of the drive motor is smaller than a reference value decided by an output request value to the drive motor, the controller stores in the memory data on operating state of a power source, out of the plurality of power sources, having an actual output value smaller than a reference value decided by a power source output request value.

DETAILED DESCRIPTION

A. First Embodiment

Figure 1:
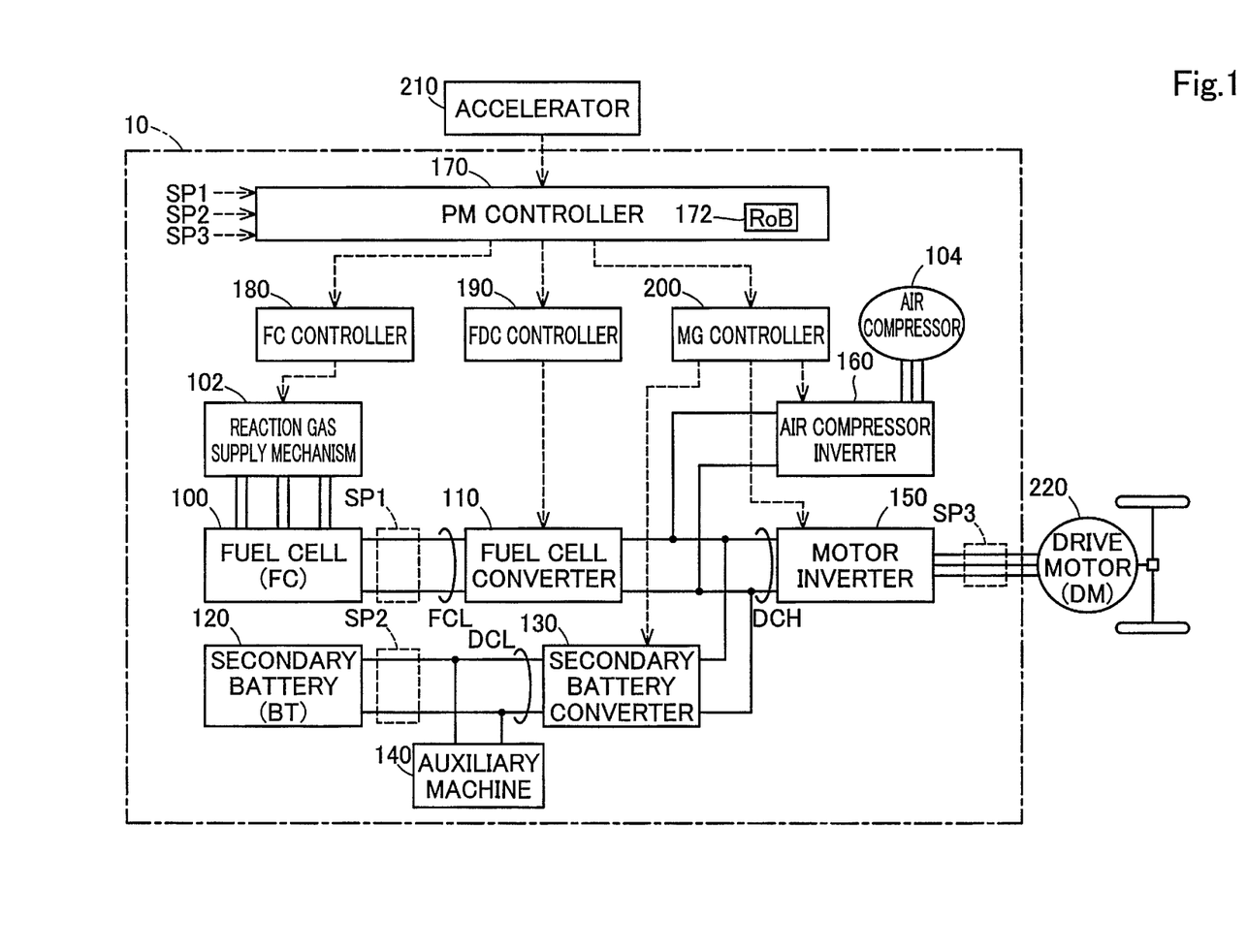
FIG. 1 is a block diagram illustrating a schematic configuration of a fuel cell system according to a first embodiment of the present disclosure.

FIG. 1 is a block diagram illustrating a schematic configuration of a fuel cell system 10 according to a first embodiment of the present disclosure. The fuel cell system 10 is installed on a vehicle, as a system to generate electricity for operating a drive motor (DM) 220 generating power. The fuel cell system 10 is activated by turning on a power switch not illustrated and is stopped by turning off the power switch.

The fuel cell system 10 includes a fuel cell (FC) 100, a fuel cell converter 110, a secondary battery (BT) 120, a secondary battery converter 130, an auxiliary machine 140, a motor inverter 150, an air compressor inverter 160, a PM controller 170, an FC controller 180, an FDC controller 190, an MG controller 200, and the drive motor 220. The fuel cell system 10 also includes a reaction gas supply mechanism 102 and an air compressor 104 as part of the reaction gas supply mechanism 102. Although not illustrated, the fuel cell system 10 is provided with various sensors (not illustrated) for detecting the temperatures of a fuel tank and the fuel cell, the flow rates, pressures, and temperatures of reaction gases (hydrogen and air), the temperature and flow rate of a coolant, the operating states of various valves, and the operating states of an air compressor and a hydrogen pump such as the number of rotations, and a cell monitor (not illustrated) for detecting a cell voltage in the fuel cell.

The fuel cell 100 is a unit that generates electricity by an electrochemical reaction of hydrogen and oxygen as reaction gases, which acts as a power source for the drive motor 220 output by the fuel cell system 10. The fuel cell 100 is formed by layering a plurality of unit cells. Each of the unit cells is an element capable of generating power alone. The unit cell has a membrane electrode gas diffusion layer assembly in which a gas diffusion layer is arranged on both surfaces of a membrane electrode assembly with an electrolyte membrane and a separator that is arranged on both outer sides of the membrane electrode gas diffusion layer assembly. The electrolyte membrane includes a thin solid polymer membrane exhibiting excellent proton conductivity under a wet condition in which water is contained therein. The fuel cell 100, which may be of various types, is a solid polymer fuel cell in the present embodiment. The fuel cell 100 is electrically connected to the fuel cell converter 110 through an FC output line FCL. The FC output line FCL is provided with an FC output sensor SP1 to measure the output of the fuel cell 100 (power determined from voltage and current).

The reaction gas supply mechanism 102 has a fuel gas supplier that supplies hydrogen as a fuel gas (also called "anode gas") to an anode of the, fuel cell 100, an oxygen gas supplier that supplies air containing oxygen as an oxidation gas (also called "cathode gas") to a cathode of the fuel cell 100, and a coolant supplier that supplies a coolant (for example, cooling water) to a coolant flow path in the fuel cell 100. The foregoing suppliers are not illustrated or described. The air compressor 104 is part of the oxidation gas supplier, which supplies air to the cathode of the fuel cell 100.

The fuel cell converter 110 is a step-up converter that raises the output voltage of the fuel cell 100 to the target voltage. The fuel cell converter 110 is electrically connected in parallel to the motor inverter 150 and the air compressor inverter 160 via a high-voltage direct-current line DCH.

The secondary battery 120 acts as a power source for the drive motor 220 together with the fuel cell 100. In the embodiment, the secondary. battery 120 is formed from a lithium ion battery. In other embodiments, the secondary battery 120 may be other kinds of batteries such as lead battery, nickel-cadmium battery, and nickel-hydrogen battery. The secondary battery 120 is electrically connected to the secondary battery converter 130 via a low-voltage direct-current line DCL. A BT output sensor SP2 is provided at an end of the low-voltage direct-current line DCL on the secondary battery 120 side to measure the output of the secondary battery 120 (power determined from voltage and current).

The secondary battery converter 130 is a step-up converter that is configured in a similar manner to the fuel cell converter 110. The secondary battery converter 130 is electrically connected in parallel to the fuel cell converter 110, the motor inverter 150, and the air compressor inverter 160 via the high-voltage direct-current line DCH. The secondary battery converter 130 adjusts the voltage in the high-voltage direct-current line DCH as input voltage to the motor inverter 150 and the air compressor inverter 160 to control the charge and discharge of the secondary battery 120.

When the output power from the fuel cell converter 110 does not reach the target output power, the secondary battery converter 130 discharges the secondary battery 120, converts the output power from the secondary battery 120, and outputs the converted output power to the high-voltage direct-current line DCH side. The power output from the secondary battery converter 130 to the high-voltage direct-current line DCH is supplied to the drive motor 220 and the air-compressor 104 via the motor inverter 150 and the air compressor inverter 160. On the other hand, when the drive motor 220 generates regenerative power, the secondary battery converter 130 converts the regenerative power and outputs the same to the low-voltage direct-current line DCL side. The secondary battery converter 130 converts the output voltage of the fuel cell 100 and outputs the same to the low-voltage direct-current line DCL side. Accordingly, the secondary battery converter 130 can charge the secondary battery 120 with the power output to the low-voltage direct-current line DCL and supply the power to the auxiliary machine 140. The secondary battery converter 130 may be configured differently from the fuel cell converter 110.

The auxiliary machine 140 is an auxiliary machine used for driving the fuel cell 100, which constitutes part of the reaction gas supply mechanism 102. The auxiliary machine 140 is electrically connected to the low-voltage direct-current line DCL to operate with a consumption of power supplied to the low-voltage direct-current line DCL. The auxiliary machine 140 includes a hydrogen circulation pump for circulating hydrogen as an anode gas in the fuel cell 100, a coolant pump in a cooling device for cooling the fuel cell 100, and others, for example.

The motor inverter 150 converts direct-current power supplied from the fuel cell 100 and the secondary battery 120 via the high-voltage direct-current line DCH into three-phase alternating-current power. The motor inverter 150 is electrically connected to the drive motor 220 installed on the vehicle to supply the three-phase alternating-current power to the drive motor 220. The motor inverter 150 also converts regenerative power generated in the drive motor 220 into direct-current power and outputs the same to the high-voltage direct-current line DCH. The air compressor inverter 160 also converts direct-current power supplied from the fuel cell 100 and the secondary battery 120 via the high-voltage direct-current line DCH to three-phase alternating-current power. The air compressor inverter 160 is electrically connected to the air compressor 104 to supply the three-phase alternating-current power into the air compressor 104. The line connecting the motor inverter 150 and the drive motor 220 is provided with a DM output sensor SP3 to measure output supplied to the drive motor 220 (power determined from voltage and current). When the output supplied from the fuel cell 100 and the secondary battery 120 to the motor inverter 150 via the high-voltage direct-current line DCH is normal and the operation of the motor inverter 150 is normal, the output supplied to the drive motor 220 can be said to be equivalent to the power (output) of the drive motor 220. In this case, an output shortage of the drive motor 220 appears as a shortage of power to be supplied to the drive motor 220.

The drive motor 220 is a power generation device that is driven with a supply of power from the fuel cell 100 and the secondary battery 120. When an accelerator 210 is instructed to decelerate, the drive motor 220 decreases output (torque) until shift to regenerative running. In the present embodiment, after a certain period of time has passed since the accelerator 210 was instructed to decelerate and then the accelerator input became zero, the drive motor 220 shifts from power running to regenerative running. In other embodiments, when the output (torque) becomes equal to or less than a setting value, the drive motor 220 may shift from power running to regenerative running.

The PM controller 170 controls operations of the components of the fuel cell system 10. The PM controller 170 constitutes an integral controller that controls integrally the operations of various controllers such as the FC controller 180, the FDC. controller 190, and the MG controller 200 to control the operations of the components of the fuel cell system 10.

The PM controller 170 determines a motor output request value to the drive motor 220 according to the accelerator input (hereinafter, also called "DM output request value"), an FC output request value to the fuel cell 100 (hereinafter, also called "FC output request value"), and a BT output request value to the secondary battery 120 (hereinafter, also called "BT output request value"). The accelerator input accepted by the accelerator 210 refers to the ratio (%) of the actual operation amount to the entire movable range of the accelerator 210. The accelerator input is determined by the magnitude of a signal detected by an accelerator sensor not illustrated. The power sources for the drive motor 220 are the fuel cell 100 and the secondary battery 120, and thus the fuel cell 100 and the secondary battery 120 supply power corresponding to the DM output request value. Accordingly, the FC output request value and the BT output request value are decided by distributing the motor output request value depending on the operating state of the fuel cell 100 (for example, the output-limited state or not) and the operating state of the secondary battery 120 (for example, SOC (state of charging).

The PM controller 170 also outputs to the FC controller 180 a signal indicating the FC output request value, and outputs to the FDC controller 190 a power request signal for causing the fuel cell converter 110 to output power corresponding to the FC output request value. The PM controller 170 also outputs to the MG controller 200 a compressor request signal for operating the air compressor 104 corresponding to the FC output request value. The PM controller 170 also outputs to the MG controller 200 a BT request signal for causing the secondary battery converter 130 to output power corresponding to the BT output request value. The PM controller 170 also outputs to the MG controller 200 a signal indicating the motor output request value (DM output request value) to cause the motor inverter 150 to output power for activating the drive motor 220 in the state corresponding to the motor output request value (motor torque request value).

The FC controller 180 controls the operation of the reaction gas supply mechanism 102 such that the fuel cell 100 operates (generates electricity) in the state according to the FC output request value. Accordingly, the reaction gas supply mechanism 102 supplies a reaction gas to the fuel cell 100 and cools the fuel cell 100 according to the FC output request value.

The FDC controller 190 controls the operation of the fuel cell converter 110 such that the fuel cell converter 110 outputs power corresponding to the FC output request value. Accordingly, the fuel cell converter 110 outputs power corresponding to the FC output request value to the high-voltage direct-current line DCH.

The MG controller 200 is a high-voltage unit controller. The MG controller 200 controls the operation of the air compressor inverter 160 according to the compressor request signal to operate the air compressor 104. The MG controller 200 also controls the operation of the secondary battery converter 130 according to the BT request signal. The secondary battery converter 130 outputs power corresponding to the BT output request value to the high-voltage direct-current line DCH. In addition, when the drive motor 220 regenerates power to the high-voltage direct-current line DCH via the motor inverter 150, the secondary battery converter 130 outputs the regenerated power to the low-voltage direct-current line DCL. The MG controller 200 controls the operation of the motor inverter 150 according to the motor output request value. The motor inverter 150 supplies power to the drive motor 220 for activating the drive motor 220 in the state corresponding to the motor output request value.

The PM controller 170, and the FC controller 180, the FDC controller 190, and the MG controller 200 integrally controlled by the PM controller 170 are computers including a CPU, memories such as a ROM and a RAM, and an interface not illustrated. In the present embodiment, the ROM and the RAM are semiconductor memories. These controllers act as functional controllers that execute software stored in the memories to perform the foregoing respective functions. The secondary battery converter 130, the motor inverter 150, and the air compressor inverter 160 are controlled by the MG controller 200, but may be controlled instead by their respective independent controllers. The controllers 180, 190, and 200 may be included in the PM controller 170.

The PM controller 170 has a pre-assigned area 172 of the memory for storing a vehicle control history (RoB). Hereinafter, the area 172 will also be called simply "vehicle control history 172". The PM controller 170 uses signals received from various sensors and cell monitors not illustrated to monitor the operating states of the components of the fuel cell system 10 installed on the vehicle, and stores the history in the vehicle control history 172 as appropriate. For example, the PM controller 170 stores a history of occurrence of an output shortage in the vehicle control history 172, based on the power (output) of the drive motor 220 measured by a DM output sensor SP3, the FC output value measured by an FC output sensor SP1, and the BT output value measured by a BT output sensor SP2. The vehicle control history 172 is used for maintenance and repairs at service stores and others.

Figure 2:
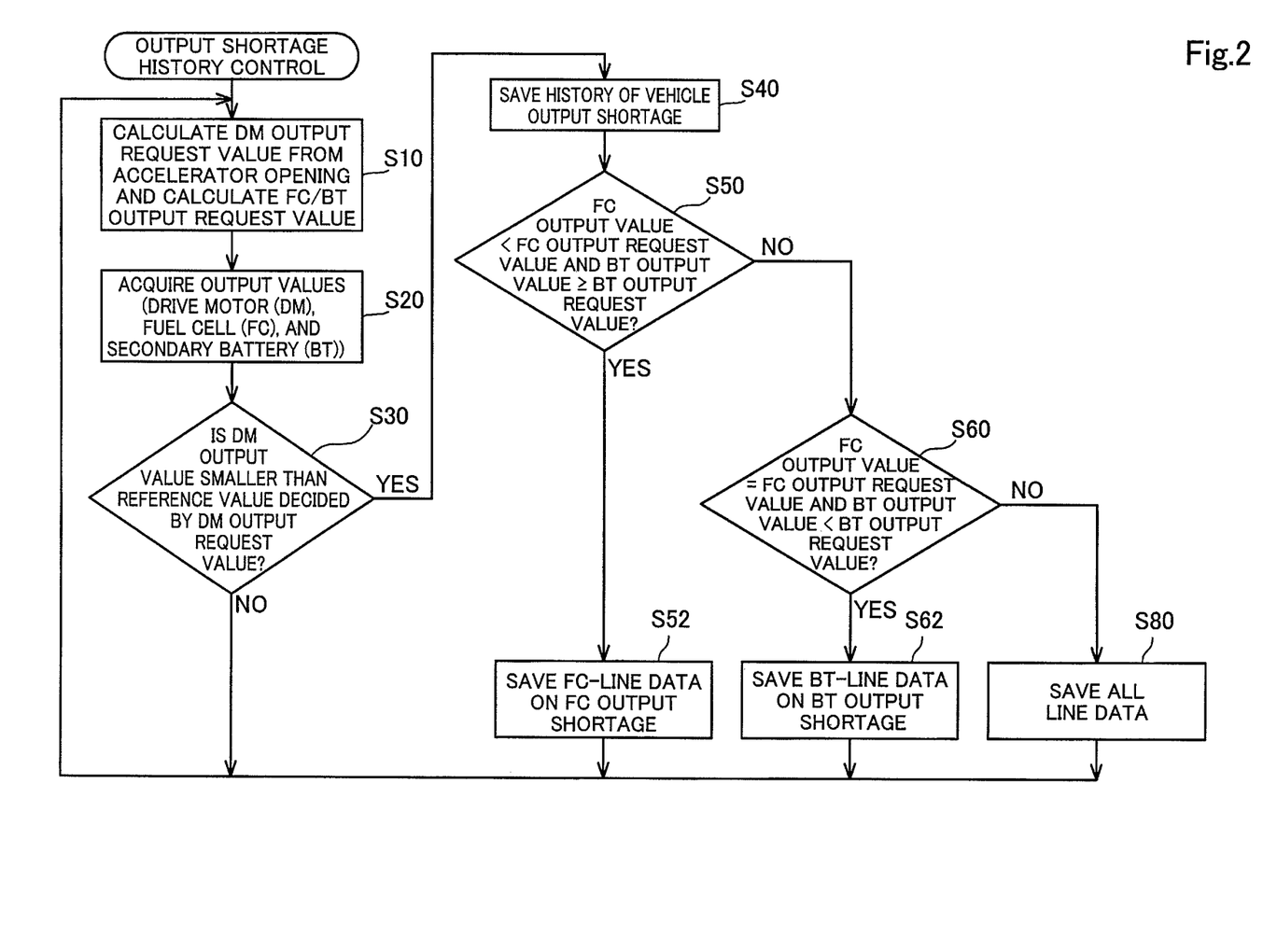
FIG. 2 is a flowchart illustrating a history. control process in a vehicle equipped with the fuel cell system.

FIG. 2 is a flowchart illustrating a process for controlling the handling of the history of output shortages in the vehicle equipped with the fuel cell system 10 (hereinafter, also called "history control process"). The history control process is continuously performed by the PM controller 170 during operation from the start of the fuel cell system 10 (FIG. 1) by turning on a power switch not illustrated to the stop of the fuel cell system 10 by turning off the power switch.

First, in step S10, the PM controller 170 calculates the value of motor torque (motor output) indicating power required of the drive motor 220, that is, the motor output request value (DM output request value), from the accelerator input according to the user's operation of the accelerator 210, and calculates the fuel cell output request value (FC output request value) and the secondary battery output request value (BT output request value). The FC output request value and the BT output request value are determined by distribution of the DM output request value according to the operating state of the fuel cell 100 (for example, the output-limited state or not) and the operating state of the secondary battery 120 (for example, the state of charge (SOC)) as described above.

Next, in step S20, the PM controller 170 acquires the output value measured by the DM output sensor SP3 as the DM output value of the drive motor 220. The PM controller 170 also acquires the output value measured by the FC output sensor SP1 as the FC output value of the fuel cell 100. The PM controller 170 also acquires the output value measured by the BT output sensor SP2 as the BT output value of the secondary battery 120. The DM output value corresponds to the actual output value of the drive motor, the FC output value corresponds to the actual output value of the fuel cell, and the BT output value corresponds to the actual output value of the secondary battery.

In step S30, the PM controller 170 determines whether the DM output value is smaller than the reference value determined by the DM output request value. This determination is made to determine whether the DM output value is smaller than the DM output request value to the extent that the user feels a shortage of output of the vehicle (the power of the drive motor 220). The following processes (a1) and (a2) are applicable to this determination.

(a1) The DM output value and the DM output request value are respectively handled by DM output ratio RPm and DM output request ratio RPmrq, which are ratios (%) with respect to the DM output value Pm and the DM output request value Pmrq. The minimum value of the DM output ratio RPm to the extent that the user feels no output shortage is set as reference value RPr. When the DM output ratio RPm is smaller than the reference value RPr, the PM controller 170 determines that the DM output ratio RPm is smaller than the DM output request ratio RPmrq to the extent that the user feels an output shortage of the vehicle.

(a2) The DM output value and the DM output request value are respectively handled by DM output ratio RPm and DM output request ratio RPmrq, which are ratios (%) with respect to the DM output value Pm and the DM output request value Pmrq. When a difference $\Delta$RPm (=RPmrq−RPm) between the DM output request ratio RPmrq and the DM output ratio RPm is larger than a tolerance RPtlr, the PM controller 170 determines that the DM output ratio RPm is smaller than the DM output request ratio RPmrq to the extent that the user feels an output shortage of the vehicle. The tolerance RPtlr is a decrease in the DM output ratio RPm that is tolerated without causing the user to feel an output shortage. In other words, when the DM output ratio RPm is smaller than a value calculated by subtracting the tolerance RPtlr from the DM output request ratio RPmrq, the PM controller 170 determines that the DM output ratio RPm is smaller than the DM output request ratio RPmrq to the extent that the user feels an output shortage of the vehicle. In this case, the value calculated by subtracting the tolerance RPtlr from the DM output request ratio RPmrq corresponds to the reference value.

In this case, the DM output ratio RPm causing a feeling of an output shortage varies among individual users, and thus the reference value RPr and the tolerance RPtlr are preferably set in advance by experiment or the like in consideration to individual differences. It is generally considered that, when the DM output ratio RPm drops 40% or more from the DM output request ratio RPmrq, most users would have a feeling of strangeness. Thus, the reference value RPr is preferably set within a range of 60% RPr<80%. The tolerance RPtlr is preferably set within a range of 20%<RPtlr 40%.

In the processes (a1) and (a2), the DM output value and the DM output request value are handled by the DM output ratio RPm and the DM output request ratio RPmrq. This is because they can be handled in the same manner regardless of the magnitude of the DM output request value Pmrq. However, the present disclosure is not limited to this but the following process (a3) and (a4) may be applied using directly the DM output value Pm and the DM output request value Pmrq.

(a3) The relationship between the DM output request value Pmrq and a reference value Pr as the minimum value of the DM output value Pm to the extent that the user feels no output shortage, is determined in advance. The reference value Pr corresponding to the DM output request value Pmrq is decided from this relationship. When the DM output value Pm is smaller than the reference value Pr, the PM controller 170 determines that the DM output value Pm is smaller than the DM output request value Pmrq to the extent that the user feels an output shortage of the vehicle.

(a4) The relationship between the DM output request value Pmrq and a decrease (tolerance) Ptlr in the DM output value Pm to the extent that the user feels no output shortage is determined in advance, and the tolerance Ptlr corresponding to the DM output request value Pmrq is decided from this relationship. When a difference $\Delta$Pm (=Pmrq−Pm) between the DM output request value, Pmrq and the DM output value Pm is larger than the tolerance Ptlr, the PM controller 170 determines that the DM output value Pm is smaller than the DM output request value Pmrq to the extent that the user feels an output shortage of the vehicle. In other words, when the DM output value Pm is smaller than the value calculated by subtracting the tolerance Ptlr from the DM output request value Pmrq, the PM controller 170 determines that the DM output value Pm is smaller than the DM output request value Pmrq to the extent that the user feels an output shortage of the vehicle. In this case, the value calculated by subtracting the tolerance Ptlr from the DM output request value Pmrq corresponds to the reference value.

When the DM output value is equal to or greater than the reference value (step S30: NO), the PM controller 170 repeats step S10 and subsequent steps. In contrast, when the DM output value is smaller than the reference value (step S30: YES), the PM controller 170 determines in step S40 that the vehicle has caused an output shortage, and saves schematic data on the output shortage in the vehicle control history 172 (FIG. 1). The schematic data saved here is data having an amount of information to the extent that the occurrence of the output shortage is recognizable. The schematic data includes at least, for example, the DM output request value to the drive motor 220 and the measured DM output value, the FC output request value to the fuel cell 100 and the measured FC output value, and the BT output request value to the secondary battery 120 and the measured BT output value.

Next, the PM controller 170 specifies which of the fuel cell 100 and the secondary battery 120 as the power sources for the drive motor 220 has caused an output shortage, and saves data on the operating state of the specified power source in the vehicle control history 172.

First, in step S50, the PM controller 170 determines whether the BT output value of the secondary battery 120 is equal to or greater than the BT output request value and the FC output value of the fuel cell 100 is smaller than the FC output request value.

When the BT output value of the secondary battery 120 is equal to or greater than the BT output request value and the FC output value of the fuel cell 100 is smaller than the FC output request value (step S50: YES), the PM controller 170 determines in step S52 that the fuel cell 100 has caused an output shortage (FC output shortage), and saves data on the operating state of the fuel cell 100 (hereinafter, also called "FC-line data") in the vehicle control history 172 (step S52). In this instance, the PM controller 170 does not save data on the operating state of the secondary battery 120 described later (hereinafter, also called "BT-line data") in the vehicle control history 172.

When not determining that this is an FC output shortage (step S50: NO), the PM controller 170 determines in step S60 whether the FC output value is equal to the FC output request value and the BT output value is smaller than the BT output request value.

When the FC output value is equal to the FC output request value and the BT output value is smaller than the BT output request value (step S60: YES), the PM controller 170 determines in step S62 that the secondary battery 120 has caused an output shortage (BT output shortage), and saves data on the operating state of the secondary battery 120 (BT-line data) in the vehicle control history 172. In this instance, the PM controller 170 does not save data on the operating state of the fuel cell 100 (FC-line data) in the vehicle control history 172.

When not determining that this is an FC output shortage or BT output shortage (step S60: NO), none of the power sources can be specified as the cause of the output shortage. Thus, the PM controller 170 saves the data on all the lines in the fuel cell system 10 regarding the output shortage, that is, the FC-line data and the BT-line data in the vehicle control history 172 with priority placed on the saving of the data over the possibility that the data may be overwritten and erased (step S80). After saving the data in the vehicle control history 172, the PM controller 170 repeats step S10 and subsequent steps.

The causes of output shortage of the fuel cell 100 include an output shortage of the fuel cell 100 itself and an output shortage of the fuel cell converter 110 due to malfunction. Accordingly, the FC-line data includes the data on the operating state of the fuel cell 100 itself and the data on the operating state of the fuel cell converter 110 as data necessary for analyzing the cause of an output shortage of the fuel cell 100.

The data on the operating state of the fuel cell 100 itself includes data on the output voltage, current capable of being output, and cell voltage of the fuel cell 100, data on the presence or absence of a fuel shortage state, data on the operating states of constituent elements of a fuel gas supplier, data on the operating states of constituent elements of an oxidation gas supplier, data on the operating states of constituent elements of a coolant supplier of the reaction gas supply mechanism 102, and others. The data on the operating states of constituent elements of the fuel gas supplier includes various kinds of data usable for grasping the operating state of the fuel cell 100 itself such as the temperature of a fuel tank, the supply pressure of a fuel gas, and the number of rotations of a fuel gas pump. The data on the operating states of constituent elements of the oxidation gas supplier includes various kinds of data usable for grasping the operating state of the fuel cell 100 itself such as the flow rate and pressure of an oxidation gas and the number of rotations of the air compressor. The data on the operating states of constituent elements of the coolant supplier includes various kinds of data usable for grasping the operating state of the fuel cell 100 itself such as the coolant temperature and the number of rotations of a coolant pump.

The data on the operating state of the fuel cell converter 110 includes various kinds of data such as input voltage, step-up voltage, and target output power.

The BT-line data includes data on the operating state of the secondary battery 120 itself and data on the operating state of the secondary battery converter 130 as data necessary for analyzing the cause of an output shortage of the secondary battery 120. The data on the operating state of the secondary battery 120 itself includes SOC, temperature, voltage, and others. The data on the operating state of the secondary battery converter 130 includes various kinds of data such as input voltage, step-up voltage, and target output power.

The data on all the lines in the fuel cell system 10 related to an output shortage includes not only the FC-line data and the BT-line data but also data on the drive motor 220 (DM-line data). The DM-line data includes various kinds of data on the operating state of the motor inverter 150, for example, temperature, input voltage, DM output value (DM torque value), and others, as data necessary for analyzing the cause of an output shortage of the drive motor 220.

As described above, in the first embodiment, when there has occurred a shortage of output of the vehicle (power of the drive motor 220) to the extent that the user feels it (step S30: YES), the PM controller 170 specifies which of the fuel cell 100 and the secondary battery 120 as the power sources for the drive motor 220 has caused an output shortage (see steps S50 and S60). The PM controller 170 then saves the data necessary for analyzing the cause of the output shortage of the specified power source in the vehicle control history 172 (see steps S52 and S62). Accordingly, the user can easily explain the output shortage at a service store in which the user has brought the vehicle for repair, and the output shortage can be easily checked. In addition, associating the contents of the data saved in the vehicle control history 172 with the failure (output shortage) felt by the user facilitates the analysis of the failure for taking remedial measures on the failure later. Further, saving only the data on the specified power source having caused an output shortage in the vehicle control history 172 makes it possible to store and save all the data necessary for analysis of the cause of the output shortage in the vehicle control history 172 while reducing the capacity of the memory for storing the data.

B. Second Embodiment

Figure 3:
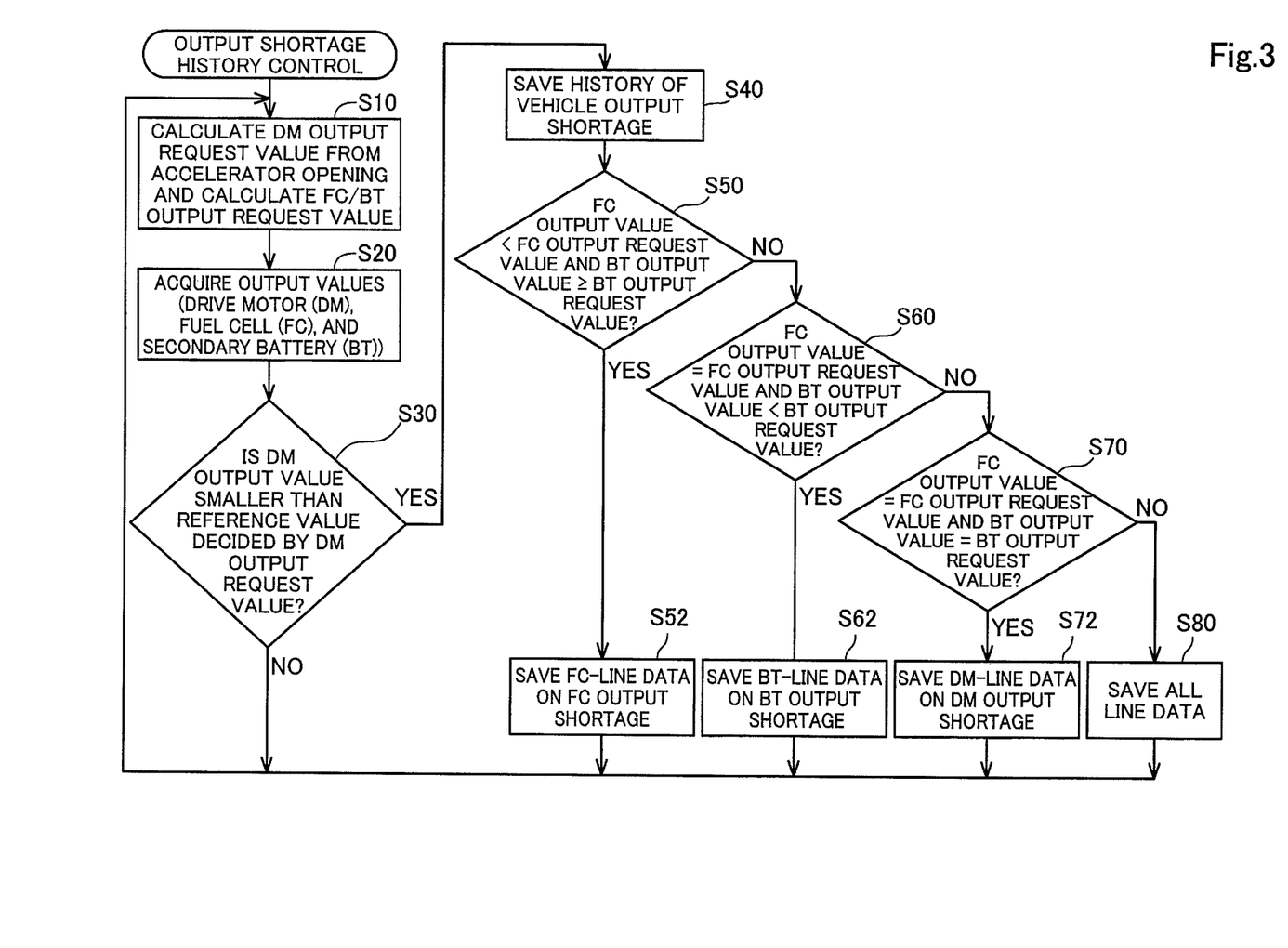
FIG. 3 is a flowchart illustrating a history control process according to a second embodiment.

FIG. 3 is a flowchart illustrating a history control process according to a second embodiment. A fuel cell system in the second embodiment is basically identical in configuration to the fuel cell system 10 in the first embodiment (FIG. 1), and the PM controller 170 performs a history control process described in FIG. 3 instead of the history control process described in FIG. 2. This history control process includes additionally a determination in step S70 between steps S60 and S80 and an operation resulting from the determination in step S72, as can be seen from the comparison with the history control process in the first embodiment (FIG. 2). Hereinafter, these steps will be described.

In step S70, when not determining that this is an FC output shortage or BT output shortage (step S50: NO and step S60: NO), the PM controller 170 determines whether the FC output value of the fuel cell 100 is equal to the FC output request value and the BT output value of the secondary battery 120 is equal to the BT output request value.

The FC output value of the fuel cell 100 is equal to the FC output request value and the BT output value of the secondary battery 120 is equal to the BT output request value (step S70: YES), the PM controller 170 determines in step S72 that the drive motor 220 itself has caused an output shortage (DM output shortage), and saves the data on the drive motor 220 (DM-line data) in the vehicle control history 172. In this instance, none of the ET-line data on the operating state of the secondary battery 120 and the FC-line data on the operating state of the fuel cell 100 is saved in the vehicle control history 172. This determination has the following reason. When the FC output value is equal to the FC output request value, the output of the fuel cell 100 including the fuel cell converter 110 is normal, and when the BT output value of the secondary battery 120 is equal to the BT output request value, the output of the secondary battery 120 including the secondary battery converter 130 is normal. That is, all the power sources for the drive motor 220 are normal. Accordingly, it is generally considered that the output shortage of the drive motor 220 is caused by the output shortage of the drive motor 220 itself including the motor inverter 150 (DM output shortage). When there has occurred no output shortage of the fuel cell 100 and the secondary battery 120 as the power sources and there has occurred no output shortage of the drive motor 220 as a power generation device (step S70: NO), the cause of the output shortage cannot be identified. In this case, the data on all the lines in the fuel cell system 10 regarding the output shortage, that is, the FC-line data, the BT-line data, and the DM-line data are saved in the vehicle control history 172, with priority placed on the saving of the data over the possibility that the data may be overwritten and erased (step S80).

As described above, in the second embodiment, when there has occurred a shortage of output of the vehicle (power of the drive motor 220) to the extent that the user feels it, the PM controller 170 determines whether which of the fuel cell 100 and the secondary battery 120 as the power sources for the drive motor 220 has caused the output shortage and determines whether the drive motor 220 itself as the power generation device has caused the output shortage (see step S70). The PM controller 170 then saves the data necessary for analyzing the cause of the output shortage of the specified power source or power generation device in the vehicle control history 172 (see step S72). Accordingly, the user can easily explain the output shortage at a service store in which the user has brought the vehicle for repair, and the output shortage can be easily checked. In addition, associating the contents of the data on the output shortage saved in the vehicle control history 172 with the failure (output shortage) felt by the user facilitates the analysis of the failure for taking remedial measures on the failure later. Further, saving only the data on the specified power source or the power generation device having caused an output shortage in the vehicle control history 172 makes it possible to store and save all the data necessary for analysis of the cause of the output shortage in the vehicle control history 172 while reducing the capacity of the memory for storing the data.

C. Other Embodiments (1) In the foregoing embodiments, the two power sources, that is, the fuel cell and the secondary battery are used as power sources as an example. Alternatively, any power source other than the two power sources may be included. As other power sources, various power sources such as a secondary battery different from the foregoing secondary battery, a fuel cell different from the foregoing fuel cell, and a power generator can be used.

Figure 4:
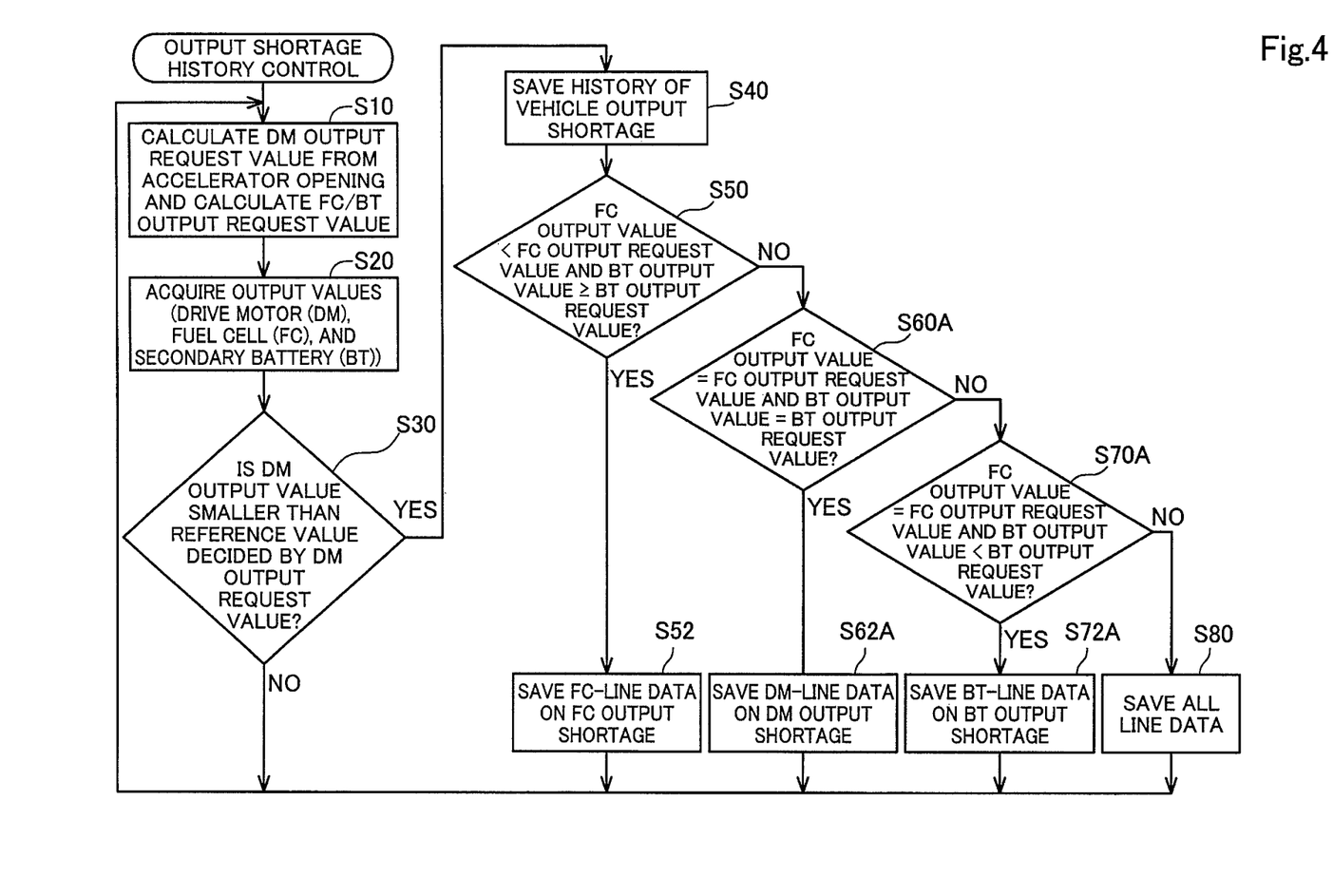
FIG. 4 is a flowchart of an example in which the order of step S60 and step S70 in FIG. 3 is changed.

(2) In the second embodiment, the order of the determinations in steps S50, S60, and S70 in the flowchart of FIG. 3 can be arbitrarily exchanged. FIG. 4 is a flowchart of an example in which the order of step S60 and step S70 in FIG. 3 is changed. Steps S60A and S62A in FIG. 4 correspond to steps S70 and S72 in FIG. 3, and steps S70A and S72A in FIG. 4 are correspond to steps S60 and S62 in FIG. 3.

(3) The causes of a shortage of output of the vehicle to the extent that the user feels it can be generally classified into an FC output shortage of the fuel cell 100, a BT output shortage of the secondary battery 120, and a DM output shortage of the drive motor 220. Accordingly, steps S70 and S80 in FIG. 3 and steps S70A and S80 in FIG. 4 may be omitted.

(4) As described above in relation to the first embodiment, the causes of an FC output shortage of the fuel cell 100 include an output shortage of the fuel cell 100 itself and an output shortage of the fuel cell converter 110 due to malfunction. Accordingly, when determining in step S50 of the history control process (FIGS. 2, 3, and 4) that an FC output shortage has occurred, the PM controller 170 may determine whether the cause of the FC output shortage resides in the fuel cell 100 itself or the fuel cell converter 110 based on the presence or absence of an output limitation on the fuel cell 100, the operating state of the fuel cell 100, and the operating state of the fuel cell converter 110, and then may save the data on the operating state of the specified one in the vehicle control history 172.

Similarly, the causes of an BT output shortage of the secondary battery 120 include an output shortage of the secondary battery 120 itself and an output shortage of the secondary battery converter 130 due to malfunction. Accordingly, when determining in step S60 of the history control process (FIGS. 2, 3, and 4) that the BT output shortage has occurred, the PM controller 170 may determine whether the cause of the BT output shortage resides in the secondary battery 120 itself or the secondary battery converter 130 based on the presence or absence of an output limitation on the secondary battery 120, the operating state of the secondary battery 120, and the operating state of the secondary battery converter 130, and then may save the data on the operating state of the specified one in the vehicle control history 172.

(5) In the foregoing embodiments, the PM controller 170 compares the DM output value (actual output value) of the drive motor 220 with the reference value decided by the DM output request value, and when the DM output value is smaller than the reference value, the PM controller 170 determines that there has occurred a shortage of output of the vehicle (power of the drive motor 220) to the extent that the user feels it, specifies the cause, and saves the data on the specified cause in the vehicle control history 172. However, this determination may be made outside the PM controller 170. In this case, the PM controller 170 may save the data on the cause specified according to the result in the vehicle control history 172. That is, regardless of whether the PM controller 170 makes this determination, when the DM output value (actual output value) of the drive motor 220 is smaller than the reference value decided by the DM output request value and there has occurred a shortage of output of the vehicle (power of the drive motor 220) to the extent that the user feels it, the PM controller 170 may specify the cause, and save the data on the specified cause in the vehicle control history 172.

The PM controller 170 compares the FC output value (actual output value) of the fuel cell 100 with the FC output request value. When the FC output value is smaller than the FC output request value, the PM controller 170 determines that there has occurred an output shortage of the fuel cell 100 (including the fuel cell converter 110), and saves the data on the operating states of the fuel cell 100 and the fuel cell converter 110 in the vehicle control history 172. Similarly, the PM controller 170 compares the BT output value (actual output value) of the secondary battery 120 with the BT output request value. When the BT output value is smaller than the BT output request value, the PM controller 170 determines that there has occurred an output shortage of the secondary battery 120 (including the secondary battery converter 130), and saves the data on the operating states of the secondary battery 120 and the secondary battery converter 130 in the vehicle control history 172. That is, the PM controller 170 compares the actual output value of one power source (the fuel cell or the secondary battery) with the output request value to the power source (power source output request value). When the actual output value is smaller than the power source output request value, the PM controller 170 determines that there has occurred an output shortage of the power source, and saves the data on the operating state of the power source in the vehicle control history 172. However, comparing the actual output value of one power source (the fuel cell or the secondary battery) with the power source output request value to determine whether the actual output value is smaller than the power source output request value may take place outside the PM controller 170. In this case, the PM controller 170 may save the data on the operating state of the power source specified as the cause of the output shortage according to the determination result in the vehicle control history 172. Specifically, regardless of whether the PM controller 170 compares the actual output value of one power source with the power source output request value and determines the cause of the output shortage, when the actual output value of one power source is smaller than the power source output request value, the PM controller 170 may save the data on the operating state of the power source in the vehicle control history 172.

(6) In the foregoing embodiments, the fuel cell system installed on a vehicle is taken as an example. However, the present disclosure is not limited to this but is also applicable to fuel cell systems installed on moving bodies such as ships and planes with electricity as a power source for a power generation device (drive motor).

(7) In the foregoing embodiments, it is determined in step S50 of FIGS. 2 to 5 whether the BT output value of the secondary battery 120 is equal to or greater than the BT output request value and whether the FC output value of the fuel cell 100 is smaller than the FC output request value.

However, for the fuel cell, it may be determined whether its output value is smaller than a reference value decided by the output request value to the fuel cell. The reference value decided by the output request value may be smaller than the output request value. The reference value decided by the output request value may be 97 of the output request value,. or 95% of the output request value, for example:

In addition, for the secondary battery, it may be determined whether its output value is greater than a reference value decided by the output request value to the secondary battery. The reference value decided by the output request value may be smaller than the output request value. The reference value decided by the output request value may be 97% of the output request value, or 95% of the output request value, for example.

(8) In the foregoing embodiment, the BT-line data on the operating state of the secondary battery 120 with the BT output value equal to or greater than the BT output request value (S50: Yes) is not saved in the vehicle control history 172 in step S52 of FIGS. 2 to 5. That is, the data on the operating state of the power source with the actual output value equal to or greater than the output request value is not stored in the memory.

However, in an embodiment in which it is determined whether the output value of a power source such as a secondary battery is greater than a reference value decided by the output request value to the power source, the following process may be performed. Specifically, when the actual output value is smaller than a reference value decided by the output request value and the data on the operating state of another power source is to be stored in the memory, the data on the operating state of the power source with the actual output value greater than a reference value decided by the output request value is not stored in the memory.

(9) In the foregoing embodiments, it is determined in step S60 of FIGS. 2 to 5 whether the FC output value is equal to the FC output request value and whether the BT output value is smaller than the BT output request value.

However, for the secondary battery, it may be determined whether its output value is smaller than a reference value decided by the output request value to the secondary battery. The reference value decided by the output request value may be smaller than the output request value. The reference value decided by the output request value may be 97% of the output request value, or 95% of the output request value, for example.

In addition, for the fuel cell, it may be determined whether its output value falls within a reference range decided by the output request value to the fuel cell. The reference range decided by the output request value may be a numerical range including the output request value. The reference range decided by the output request value may be 97 to 103% of the output request value, or 95 to 105% of the output request value, for example.

In addition, for the fuel cell, it may be determined that its output value is greater than a reference value decided by the output request value to the fuel cell. The reference value decided by the output request value may be smaller than the output request value. The reference value decided by the output request value may be 97% of the output request value, or 95% of the output request value, for example.

(10) In the foregoing embodiments, in step S62 of FIGS. 2 to 5, the FC-line data on the operating state of the fuel cell 100 with the FC output value equal to the FC output request value (S60: Yes) is not saved in the vehicle control history 172. That is, the data on the operating state of the power source with the actual output value equal to the output request value is not stored in the memory.

However, for a power source such as a fuel cell, in an embodiment in which it is determined whether its output value falls within a reference range decided by the output request value to the power source, the following process may be performed. Specifically, when the actual output value is smaller than a reference value decided by the output request value and the data on the operating state of another power source is to be stored in the memory, the data on the operating state of the power source with the actual output value within a reference range decided by the output request value to the power source is not stored in the memory.

In addition, for a power source such as a fuel cell, in an embodiment in which it is determined whether its output value is greater than a reference value decided by the output request value to the power source, the following process may be performed. Specifically, when the actual output value is smaller than a reference value decided by the output request value and the data on the operating state of another power source is to be stored in the memory, the data on the operating state of the power source with the actual output value greater than a reference value decided by the output request value is not stored in the memory.

(11) In the foregoing embodiments, in steps S52 and S62 of FIGS. 2 to 5, the data on the operating state of one power source with the actual output value smaller than the output request value is stored in the memory.

When a plurality of power sources with the actual output value smaller than the output request value (or a reference value decided by the output request value) are detected, the data on the operating states of all the plurality of power sources may be stored in the memory. Alternatively, the data on the operating states of some of the plurality of power sources may be stored in the memory. For example, out of the plurality of power sources with the actual output value smaller than the output request value (or a reference value decided by the output request value), the data on the operating states of some of the power sources may be stored in the memory on a priority basis in the descending order of the ratio of the difference between the actual output value and the output request value to the output request value.

The present disclosure is not limited to the embodiments, examples, and modifications described above but may be implemented by a diversity of other configurations without deviating from the scope of the present disclosure. For example, the technical features of any of the above embodiments, examples, and modifications corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential in the description hereof.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) In an aspect of the present disclosure, there is provided a fuel cell system installed on a vehicle. The fuel cell system comprises: a drive motor that drives the vehicle; a plurality of power sources that include a fuel cell and a secondary battery; a memory that stores data on a failure of output of the drive motor as a history; and a controller that controls writing of the data on the failure into the memory. When an actual output value of the drive motor is smaller than a reference value decided by an output request value to the drive motor, the controller stores in the memory data on operating state of a power source, out of the plurality of power sources, having an actual output value smaller than a reference value decided by a power source output request value.

According to the fuel cell system in this aspect, at occurrence of an output shortage, the power source as the cause of the output shortage is specified and the data on the operating state of the specified power source is stored in the memory, which makes it possible to store the data on the cause of the output shortage while reducing the capacity of the memory for storing the data. Accordingly, it is possible to use the history to take remedial measures on the cause of the output shortage at service stores and others.

(2) In the fuel cell system in accordance with the above-described aspect when the respective actual output values of the power sources are equal to the respective power source output request values to the power sources, the controller may store the data on the drive motor in the memory.

According to the fuel cell system in this aspect, when the outputs of all the power sources are normal, the drive motor is specified as the cause of the output shortage, and the data on the drive motor is stored as a history, which makes it possible to store the data on the cause of the output shortage while reducing the capacity of the memory for storing the data. Accordingly, it is possible to use the history to take remedial measures on the drive motor as the cause of the output shortage at service stores and others.

(3) In the fuel cell system in accordance with the above-described aspect, the power sources are the fuel cell and the secondary battery, and (a) when the actual output value of the fuel cell is smaller than a fuel cell output request value to the fuel cell, the controller may store the data on the operating state of the fuel cell in the memory, (b) when the actual output value of the secondary battery is smaller than a secondary battery output request value to the secondary battery, the controller may store the data on the operating state of the secondary battery in the memory, and (c) when the actual output value of the fuel cell is equal to the fuel cell output request value and the actual output value of the secondary battery is equal to the secondary battery output request value, the controller may store the data on the drive motor in the memory.

According to the fuel cell system in this aspect, the cause of the output shortage is specified which of the fuel cell and the secondary battery as the power sources and the drive motor, and the data on the specified cause is stored as a history, which makes it possible to store the data on the cause of the output shortage while reducing the capacity of the memory for storing the data. Accordingly, it is possible to use the history to take remedial measures on the drive motor as the cause of the output shortage at service stores and others.

The aspect of the present disclosure is not limited to a fuel cell system installed on a vehicle, but is also applicable to various modes such as a fuel cell system installed on a moving body with electricity as a power source, a moving body such as a vehicle equipped with a fuel cell system, and methods of controlling these system and body, for example. The present disclosure can be implemented in an aspect of a method of controlling a fuel cell system. The present disclosure is not limited to the foregoing aspects but can be implemented in various modes without deviating from the scope of the present disclosure.

What is claimed is:

1. A fuel cell system installed in a vehicle, comprising:
 a drive motor that drives the vehicle;
 a plurality of power sources that include a fuel cell and a secondary battery;
 a memory that stores data on a failure of output of the drive motor as a history, the data including measurement values on operating state of a power source, out of the plurality of power sources, having an actual output value smaller than a reference value decided based on a power source output request value; and
 a controller that controls writing of the data on the failure into the memory,
 wherein when an actual output value of the drive motor is smaller than a reference value decided based on an output request value of the drive motor, the controller stores in the memory the measurement values on operating state of the power source, out of the plurality of power sources, having the actual output value smaller than the reference value decided based on the power source output request value, and the controller does not store in the memory measurement values on operating state of one or more power sources, out of the plurality of power sources, other than the power source having the actual output value smaller than the reference value decided based on the power source output request value, and
 wherein when the actual output value of the drive motor is not smaller than the reference value decided based on the output request value of the drive motor, the controller does not store in the memory the measurement values on operating state of the plurality of power sources.

2. The fuel cell system in accordance with claim 1, wherein when the respective actual output values of the plurality of power sources are equal to the respective power source output request values of the plurality of power sources, the controller stores the measurement values on the drive motor in the memory.

3. The fuel cell system in accordance with claim 2, wherein:
the plurality of power sources are the fuel cell and the secondary battery,
(a) when the actual output value of the fuel cell is smaller than a fuel cell output request value of the fuel cell, the controller stores the measurement values on the operating state of the fuel cell in the memory, and the controller does not store measurement values on the operating state of the secondary battery in the memory,
(b) when the actual output value of the secondary battery is smaller than a secondary battery output request value of the secondary battery, the controller stores the measurement values on the operating state of the secondary battery in the memory, and the controller does not store the measurement values on the operating state of the fuel cell in the memory, and
(c) when the actual output value of the fuel cell is equal to the fuel cell output request value and the actual output value of the secondary battery is equal to the secondary battery output request value, the controller stores the measurement values on the drive motor in the memory, and the controller does not store the measurement values on the operating state of the secondary battery or the measurement values on the operating state of the fuel cell in the memory.

4. A method of controlling a fuel cell system installed in a vehicle, the fuel cell system comprising: a drive motor that drives the vehicle; a plurality of power sources that include a fuel cell and a secondary battery; a memory that stores data on a failure of output of the drive motor as a history, the data including measurement values on operating state of a power source, out of the plurality of power sources, having an actual output value smaller than a reference value decided based on a power source output request value; and a controller that controls writing of the data on the failure into the memory,
the method comprising:
when an actual output value of the drive motor is smaller than a reference value decided based on an output request value to the drive motor, storing, by the controller, in the memory the measurement values on operating state of the power source, out of the plurality of power sources, having the actual output value smaller than the reference value decided based on the power source output request value, without storing in the memory measurement values on operating state of one or more power sources, out of the plurality of power sources, other than the power source having the actual output value smaller than the reference value decided based on the power source output request value, and
when the actual output value of the drive motor is not smaller than the reference value decided based on the output request value of the drive motor, not storing in the memory the measurement values on operating state of the plurality of power sources.

5. The method of controlling the fuel cell system in accordance with claim 4, further comprising:
when the respective actual output values of the plurality of power sources are equal to the respective power source output request values to the plurality of power sources, storing, by the controller, the measurement values on the drive motor in the memory.

6. The method of controlling the fuel cell system in accordance with claim 5, wherein the power sources are the fuel cell and the secondary battery, and the method further comprising:
(a) when the actual output value of the fuel cell is smaller than a fuel cell output request value of the fuel cell, storing, by the controller, the measurement values on the operating state of the fuel cell in the memory, without storing the measurement values on the operating state of the secondary battery in the memory,
(b) when the actual output value of the secondary battery is smaller than a secondary battery output request value of the secondary battery, storing, by the controller, the measurement values on the operating state of the secondary battery in the memory, without storing the measurement values on the operating state of the fuel cell in the memory, and
(c) when the actual output value of the fuel cell is equal to the fuel cell output request value and the actual output value of the secondary battery is equal to the secondary battery output request value, storing, by the controller, the measurement values on the drive motor in the memory, without storing the measurement values on the operating state of the secondary battery or the measurement values on the operating state of the fuel cell in the memory.

* * * * *